United States Patent [19]

Dixon

[11] 3,931,845

[45] Jan. 13, 1976

[54] TIRE CHANGING DEVICE
[76] Inventor: Tracy W. Dixon, 3007 Topham Circle, Houston, Tex. 77018
[22] Filed: Aug. 12, 1974
[21] Appl. No.: 496,572

[52] U.S. Cl. .............................................. 157/1.22
[51] Int. Cl.² ........................................ B60C 25/04
[58] Field of Search ........................... 157/1.22, 1.24

[56] References Cited
UNITED STATES PATENTS
1,480,371   1/1924   Cattoni .............................. 157/1.22
FOREIGN PATENTS OR APPLICATIONS
13,622   5/1904   United Kingdom ................. 157/1.22
603,787   6/1948   United Kingdom ................. 157/1.22

*Primary Examiner*—Al Lawrence Smith
*Assistant Examiner*—Harold P. Smith, Jr.
*Attorney, Agent, or Firm*—Robert W. B. Dickerson

[57] ABSTRACT

A device for removing from and replacing a tire, particularly a motorcycle tire, on a rim, comprising a placement member linked to one portion of a telescoping housing and an adjustably positionable tang linked to a further portion of said body.

1 Claim, 4 Drawing Figures 3,931,845

TIRE CHANGING DEVICE

BACKGROUND OF THE PRIOR ART

Since the advent of wheeled vehicles, users have been faced with problems involving the replacement or repair of such wheels. Presently used vehicles normally include plurality of tires mounted on rims. While numerous devices have been developed for assisting in the removal of the tire from the rim, and replacement thereon, effective developments have been so bulky as to require a trip to a service station or other repair facility. Obviously, it would be helpful for a vehicle user to be able to remove and replace tires while in transit. This facility would be especially helpful for motorcycle users, who customarily do not carry a spare rim. Exemplary efforts made at developing utilitarian tools in this are shown in the following U.S. Pats. Nos. 643,528; 1,234,141; 1,480,371; 1,587,634; 1,938,940; 2,547,976; 3,037,549; 3,050,110; 3,125,152; 3,247,883; 3,771,581; 3,789,894.

SUMMARY OF THE INVENTION

Applicant provides a housing have telescoping segments. Both gross and fine adjustment means may be provided, for use with rims or tires of differing diameters. A positioning member is pivotally fixed to one segment, for insertion within the wheel or rim opening. Opposite from such positioning member, a tang is removably linked to another of the housing segments. Such tank, for insertion intermediate the tire and rim, may have its position reversed, depending on the specific use of the device, i.e., for removal or replacement of the tire.

DESCRIPTION OF THE DRAWINGS

FIG. 1 generally illustrates the device of this invention by the numeral 20. The housing is shown to be comprised of three telescoping sections 21, 22, and 23. Square or rectangular shape is the preferred configuration of each section, as illustrated in FIG. 2, although other shapes are contemplated.

Figure 1:
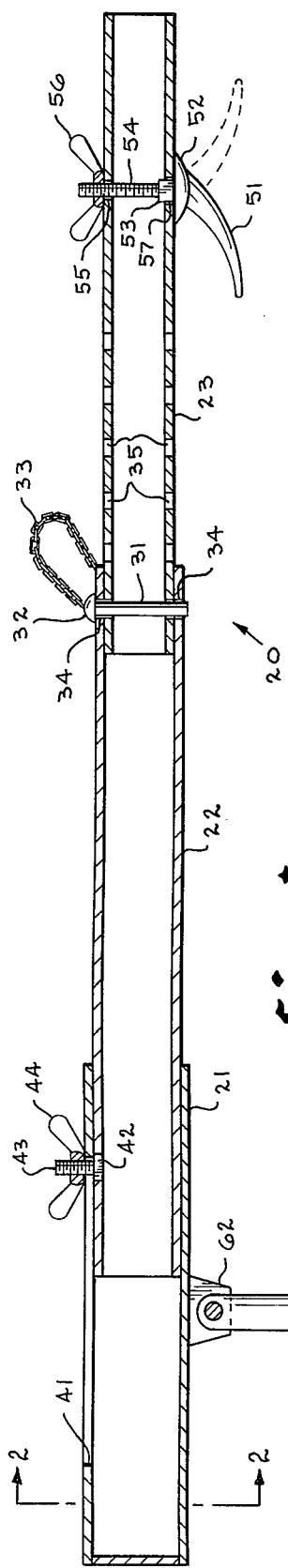
FIG. 1 is a vertical section through the extended device.
Figure 2:
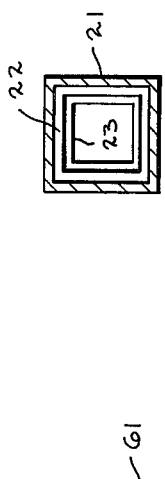
FIG. 2 is a sectional view taken along lines 2-2 of FIG. 1.
Figure 3:
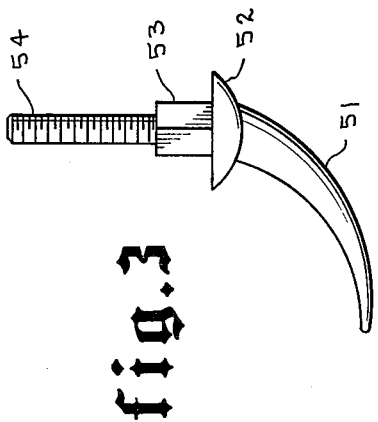
FIG. 3 is an elevation of the tang portion.

Means are provided to adjustably increase or decrease the overall length of the device. This accommodates utilization with tires of differing sizes, as well as permits compacting the device so that it may be easily stored and transported. Both gross and fine adjustment means are provided. Gross adjustment is provided as follows. Pin 31, having a head 32 which may be connected by chain 33 to housing section 22, is removably insertable through an aperture 34 in section 22, and through one of several spaced apertures 35 in section 23. Fine adjustment means is also provided. The example illustrated includes an axially extending slot 41 extending for a substantial distance through one wall of section 21. A bolt is shown having a head 42 fixed to a threaded shaft 43, said shaft extending through slot 41 of section 21. A wing nut 44 may then threadedly engage shaft 43, and be rotated so as to make a tight fit and secure sections 21 and 22 in any desired relative position. Obviously, numerous modifications of such adjustment means are possible, such as by providing a threaded aperture through section 22 and threadedly engaging a threaded bolt through slot 41 and such aperture.

At one end of the device, a combination mounting and demounting member is provided for entry between the tire and rim. Such member includes a tang 51 extending from the cap 52 of a square head 53. Extending from said head, opposite from cap 52, is threaded shaft 54. This shaft would extend through an aperture 55 in section 23 to be engaged and tightened by wing nut 56. Head 53 removably fits within an aperture 57 in section 23, opposite from 55, which aperture 57 is configured correlative to head 53. Obviously, applicant is not limited to a square configuration, merely to any which will secure, without slippage, head 53 to section 23. This is necessary to permit the 180 degree reversal of tang 51, as illustrated by the phantom lines of FIG. 1.

Moving now to the opposite end of FIG. 1, a fixing member is shown which comprises a bar or lever 61, which may be pivotally linked to a flange 62 of section 21.

Figure 4:
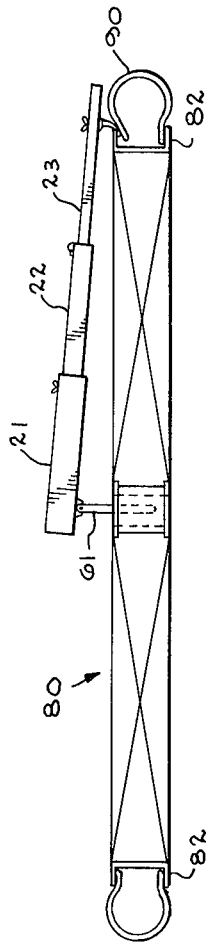
FIG. 4 is partly schematic elevation of the device positioned on a rim, in operative position for replacing the tire thereon.

Consider now the operation of the device, as shown in FIG. 4. A wheel 80 is generally illustrated, having a central hub 81 and a peripheral rim 82. Normally, a tire 90 is annularly positioned outside of and around the rim 82. As illustrated, the tire device 20 is positioned for replacing the tire 90 on the rim, i.e., with tang 51 facing radially inward of wheel 80. Member 61 would be pivoted so as to be approximately perpendicular to the housing sections and positioned substantially within an opening in hub 81. The sections 21, 22 and 23 would be properly adjusted so that tang 51 would be so positioned as to extend intermediate tire 90 and rim 82. By rotating the device about supporting member 61, the tire may be expeditiously replaced on the rim in a known manner. When tire removal is desired, for repair purposes, tang 51 may have its position modified so as to face outwardly by removing wing nut 56, removing head 53 and turning the tang. The tang would then be reinserted between the tire and rim, and the entire device rotated, as known.

Upon completion of the operation, the sections 21, 22, 23 may be telescoped into their most compact position, and lever 61 pivoted so as to rest adjacent section 21. Such a compact arrangement permits the device to be comfortably carried in the minimum space, such as alongside the body of a motorcycle.

Although limited embodiments have been described, it should be obvious that numerous modifications would be possible by one skilled in the art without departing from the spirit of the invention, the scope of which is limited only by the following appended claims.

I claim:

1. A device for removing and affixing a tire from and on a wheel rim, comprising:

A housing having a plurality of telescoping sections;
means for adjusting the overall length of said housing;
means connected to one of said sections for pivotally supporting said housing within said wheel; and
Combination mounting and demounting means movably linked to one of said sections, said combination means comprising;
    a. tool having a tang portion adapted to be inserted intermediate said tire and rim, b. means for permitting said tang to assume a plurality of positions relative to said linked section, such means comprising a male portion of said tool having a polygonal cross-section and an aperture in said linked section of a configuration correlative to said cross-section, and c. means for releasably fixing said tank in any selective one of said positions.

* * * * *